United States Patent Office 3,053,737
Patented Sept. 11, 1962

3,053,737
N-ACETYL-p-AMINOPHENOL ANTIINFLAMMATORY STEROID COMPOSITIONS
Willard J. Johnson, % Frank W. Horner Ltd., Box 959, Montreal, Quebec, Canada
No Drawing. Filed Nov. 9, 1959, Ser. No. 851,513
Claims priority, application Canada Sept. 4, 1957
7 Claims. (Cl. 167—77)

This invention relates to a pharmaceutical preparation for inhibiting the glucuronylation of therapeutically active compounds which become glucuronylated in the body. More particularly the present invention is directed to the inhibition of the glucuronylation of steroids so as to effect a decreased rate of inactivation of administered steroid and consequently, increased biological efficacy.

Steroids are administered for various purposes including the treatment of rheumatoid arthritis, gouty arthritis, osteoarthritis, allergic arthritis, bursitis, myositis, fibrositis, bronchial asthma, rheumatic fever, allergic diseases and inflammatory ocular diseases. The effectiveness of this treatment is however hampered by rapid inactivation and excretion of the aministered steroid. Thus, Migeon et al. J. Clin. Endoc. and Metab. 16, 1137, 1956 found that hydrocortisone, administered intravenously to man disappeared rapidly from the blood. Fifteen to twenty minutes after the injection only 12 to 15% of the dose was present as free steroid in the estimated total plasma volume.

The inactivation and excretion of adrenal and gonadal steroid hormones is controlled mainly by the liver, inasmuch as the liver converts these steroids to compounds more readily excreted by the kidneys than is the parent steroid. The bulk of urinary steroids are present as water soluble conjugates of glucuronic acid and sulfuric acid. Thus, as reported by Peterson, R. E., and Wyngaarden, J. B., Am. N.Y. Acad. Sci. 61, 297, 1955, it has been found that 94 percent of administered hydrocortisone can be accounted for through urinary excretion, and 2 percent through the feces. Of the urinary excretion, practically the entire quantity appears as a water soluble conjugate, mostly as the glucuronide which possesses no physiological activity. A recent study reported by Hartiala Acta Physiologica Scandinavia, Vol. 42, Suppl. 145 IX Scand. Physiol. Congress in Stockholm 1957 has shown that the intestinal mucosa also contributes to the glucuronide conjugation of steroids.

Further experiments are reported by Hechter, O., Caspi, F. E., and Frank, H., Endocrinology 60, 705, 1957, who infused cortisone at a constant rate into the portal vein of a dog. It was found that only about 4% of the infused cortisone emerged from the liver as unaltered cortisone or hydrocortisone. The corticoid disappearance as a result of circulation through the liver was not due to accumulation or retention of the administered corticoid in either liver or bile. Further studies indicated that the major portion of the administered corticoid was rendered highly water soluble, "probably by conjugation."

These, and other studies, indicate that as the rate of transformation of steroids to their respective glucuronides is extremely rapid the reactions in which the hormone participates in order to exert its unique physiological activity must occur within a short time following either the secretion or introduction of the steroid into the body.

This invention is based on the idea of increasing the physiological effect of endogenous or exogenous steroids which are inactivated in the body by glucuronylation by retarding their glucuronylation through the use of a competitive glucuronylation inhibitor.

All glucuronides are composed of two moieties:

(1) *The aglycone or glucuronic acid acceptor.*—Examples are adrenal, gonadal and thyroid hormones, various phenols and alcohols bearing a free hydroxyl group, various amines such as aniline, p-phenetidine, and p-toluidine. The administration of these aglycones to certain species of animals and to humans leads to the excretion of the corresponding glucuronide in the urine.

(2) *Glucuronic acid.*—Glucuronide formation takes place in the liver. Uridinediphosphate glucuronic acid (UDPGA), the "active" form of glucuronic acid has been shown to participate in glucuronide synthesis. The reaction involves the transfer of glucuronic acid from UDPGA to the aglycone, and is catalyzed by an enzyme, glucuronyl transferase. When the aglycone is an alcohol or phenol the reaction can be schematized as follows:

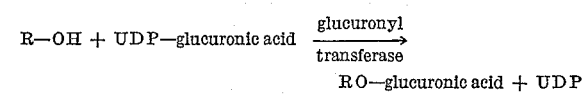

The same enzyme catalyzes the transfer of the glucuronic acid moiety of UDPGA to a wide range of aglycones to form the corresponding glucuronides.

The concentration of free hydrocortisone in the blood plasma of normal human subjects ranges from 6 to 25 micrograms per 100 ml., with a mean of 15±4.5(4). The amount of this hormone present in the plasma represents an equilibrium between formation of hydrocortisone by the adrenals and inactivation by conjugation with glucuronic acid in the liver. Inhibition of the latter process tends to increase the level of circulating hydrocortisone. Similarly, inhibition of glucuronide formation tends to maintain the plasma level of administered hydrocortisone. E. M. Glenn in Endocrinology, 64, 373, 1959, states "A slower rate of inactivation or excretion of a compound from the organism necessarily implies an enhanced biological efficacy, since more steroid becomes available to responsive tissues for a longer period."

By introducing, along with the steroid, a competitive glucuronylation inhibitor the glucuronylation of the steroids or its derivative can be inhibited in vivo thus delaying inactivation of the steroid and making it effective in smaller doses. The extent of inhibition will depend, theoretically, on the ratio between inhibitor and substrate steroid.

The steroids with which this invention is concerned include those steroids, both natural and synthetic, which are subject to glucuronylation, for example, cortisone, hydrocortisone, prednisolone, prednisone, 9α-fluorohydrocortisone, triamcinolone, dexamethasone, 6α-fluorohydrocortisone, 6α-fluoroprednisolone, 6α-9α-difluoroprednisolone, 6α-methylprednisolone, 9α-fluoro-16α-methylprednisolone, 9α - fluoro - 16α - methylprednisone, and 9α-fluoro-16α-methylhydrocortisone.

The competitive glucuronylation inhibitors which can be used for the purposes of this invention are selected from the group consisting of soluble non-toxic compounds having the formula R—A where R is the active group and is at least one member selected from the group consisting of hydroxyl, and amino groups and A is selected from the group consisting of benzene, pyridine-carboxylic acid, acetanilide, N-substituted acetanilide, propionanilide, N-substituted propionanilide and benzylacetamide.

Examples of suitable glucuronylation inhibitors include:

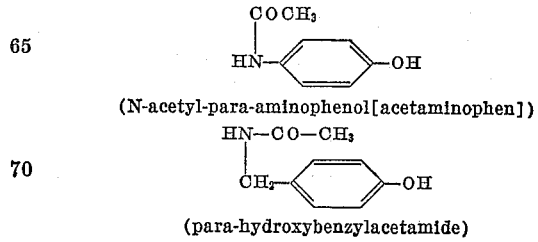

(N-acetyl-para-aminophenol[acetaminophen])

(para-hydroxybenzylacetamide)

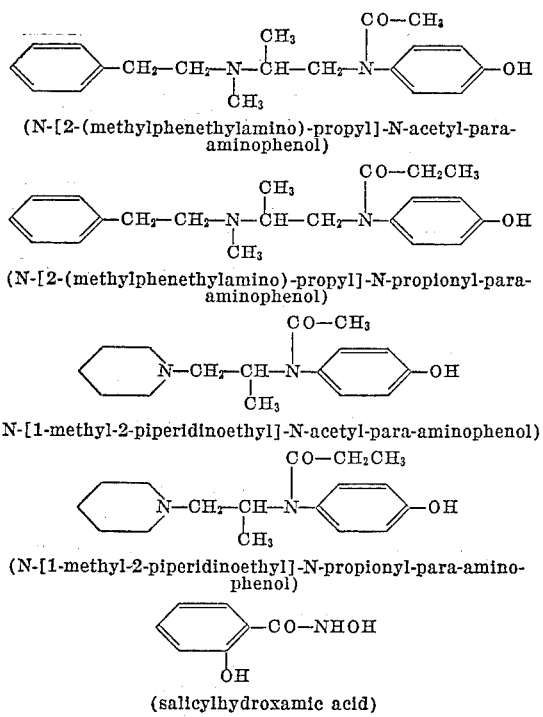

(N-[2-(methylphenethylamino)-propyl]-N-acetyl-para-aminophenol)

(N-[2-(methylphenethylamino)-propyl]-N-propionyl-para-aminophenol)

(N-[1-methyl-2-piperidinoethyl]-N-acetyl-para-aminophenol)

(N-[1-methyl-2-piperidinoethyl]-N-propionyl-para-aminophenol)

(salicylhydroxamic acid)

(5-bromosalicylhydroxamic acid); O-aminophenol; 5-bromosalicylamide; pyrogallol; pyrocatechol; and

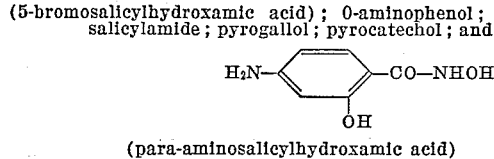

(para-aminosalicylhydroxamic acid)

This invention in its broadest aspect is of general application and is not limited to particular inhibitors.

N-acetyl-p-aminophenol is particularly suitable as a competitive glucuronylation inhibitor by virtue of the fact that it gives rise to a high rate of glucuronide formation. Eighty-five to ninety-six percent of ingested N-acetyl-p-aminophenol is recovered in the urine in the conjugated form, mainly as glucuronide but partly as ethereal sulfate; only 4 percent appears unchanged.

Experiments were carried out with the rabbit as a test animal to establish the effect of N-acetyl-p-aminophenol on the plasma levels of injected hydrocortisone.

No detectable amount of hydrocortisone is present in rabbit blood plasma due to the fact that the rabbit adrenal secretes corticosterone rather than hydrocortisone as the major hormone. The hydrocortisone plasma levels found after injection consist solely of administered hydrocortisone and cannot be construed to arise, for instance, from a stimulatory effect of N-acetyl-p-aminophenol on the adrenals. This has been verified by preliminary experiments in which it was found that three days after a single intraperitoneal injection of a 100 mg./kg. dose of hydrocortisone into rabbits there was no detectable hydrocortisone in the blood plasma. It was also found that the administration of a single 250 mg./kg. dose of N-acetyl-p-aminophenol alone, does not give rise to detectable hydrocortisone in the plasma. The latter also furnishes additional evidence that administered N-acetyl-p-aminophenol and its metabolites do not interfere with the determination of plasma hydrocortisone.

EXAMPLE I

Hydrocortisone was administered by intraperitoneal injection at dosages of respectively 100, 50, 25 and 10 mg./kg. of body weight. N-acetyl-p-aminophenol was given by stomach tube at a single dosage level of 250 mg./kg., irrespective of the hydrocortisone dosage. An interval of at least three days was allowed between successive injections of hydrocortisone to obviate the possibility of carry-over of plasma hydrocortisone from one experiment to the next. A given dose of hydrocortisone was injected into a rabbit and the plasma hydrocortisone was determined after one or two hours. Three days, and in some experiments 5 days later, N-acetyl-p-aminophenol was administered to the same rabbit, followed by the same dose of hydrocortisone previously used, and the plasma hydrocortisone level again determined. Thus, the plasma levels of free hydrocortisone in individual rabbits were determined in the presence and absence of N-acetyl-p-aminophenol, in which case the rabbits were serving as their own controls.

The results are shown in Table I. It may be seen that when N-acetyl-p-aminophenol is administered concurrently with hydrocortisone, the plasma concentration of free hydrocortisone is more than 200 percent of that which obtains when hydrocortisone alone is given.

Table I

EFFECT OF N-ACETYL-p-AMINOPHENOL ON PLASMA LEVELS OF ADMINISTERED HYDROCORTISONE AT VARIOUS DOSAGES AND TIME INTERVALS

| Rabbit number | Hydrocortisone dose mg./kg. | Time after dosage, hrs. | Hydrocortisone [1] Plasma levels | |
|---|---|---|---|---|
| | | | Without NAPA [2] µg./ml. | With NAPA (250 mg./kg.) |
| 1 | 100 | 1 | 2.44 | 9.0 |
| 2 | 100 | 1 | 4.54 | 8.59 |
| 3 | 100 | 1 | 7.67 | 7.60 |
| 7 | 50 | 1 | 4.57 | 9.41 |
| 8 | 50 | 1 | 6.31 | 25.00 |
| 12 | 50 | 1 | 10.4 | 13.5 |
| Mean | | | 7.09 | [3]15.97 |
| 13 | 25 | 1 | 5.25 | 9.30 |
| 14 | 25 | 1 | 2.20 | 4.20 |
| 15 | 25 | 1 | 3.90 | 10.20 |
| 19 | 25 | 1 | 6.40 | 10.10 |
| 20 | 25 | 1 | 4.40 | 9.40 |
| 22 | 25 | 1 | 2.30 | 9.70 |
| 23 | 25 | 1 | 3.20 | 7.10 |
| Mean | | | 3.95 | [4]8.56 |
| 33 | 25 | 2 | 4.97 | 11.15 |
| 34 | 25 | 2 | 14.72 | 23.06 |
| 6 | 25 | 2 | 5.81 | 13.31 |
| 7 | 25 | 2 | 4.68 | 17.62 |
| 8 | 25 | 2 | 5.44 | 13.87 |
| 9 | 25 | 2 | 6.94 | 12.23 |
| 10 | 25 | 2 | 5.42 | 13.89 |
| Mean | | | 6.85 | [5]15.02 |
| 12 | 10 | 2 | 2.80 | 4.15 |
| 13 | 10 | 2 | 1.50 | 2.65 |
| Mean | | | 2.15 | [6]3.40 |

[1] The Silber-Porter procedure as modified by Peterson et al (Analytical Chem. 29, 144, 1957) was used for the determination of hydrocortisone. This procedure measures free, but not conjugated, hydrocortisone.
[2] NAPA-N-acetyl-para-aminophenol.
[3] 225.24% of control.
[4] 216% of control.
[5] 220% of control.
[6] 158% of control.

It is known (Cantarow and Trumper, Clinical Biochemistry, Saunders, Philadelphia, 1955, page 423) that three structural features are essential for biological activity of adrenocortical steroids (corticoids):

(1) A 17,21-dihydroxy-20-ketone side chain at $C_{17}$
(2) A $\Delta^4$-3-keto grouping at Ring A
(3) A hydroxyl (OH) or ketonic (=O) group at $C_{11}$ These three structural features are retained in all active synthetic derivatives of cortical hormones, whatever other changes may be made in the molecule to alter the degree of activity. The Porter-Silber reaction is specific for the 17,21-dihydroxy-20-ketone side chain and the isoniazid (INH) reaction of Umberger (Analyt. Chem. 27, 768, 1955), which involves the formation of isonicotinylhydrazones of $\Delta^4$-3-ketocorticosteroids, is specific for the $\Delta^4$-3-keto group in Ring A. The amounts of free Porter-Silber and INH-reactive materials were determined in aliquots of plasma from rabbits treated with hydrocortisone alone and with hydrocortisone plus N-acetyl-p-aminophenol. In each case the values for INH-reactive materials were essentially the same as those obtained by the Porter-Silber method. These results, shown in Table II below indicate that the increased plasma levels of 17-OHCS obtained after concurrent administration of hydrocortisone and N-acetyl-p-aminophenol are comprised mainly of biologically active steroids since they retain the essential groupings.

*Table II*

COMPARISON BETWEEN PORTER-SILBER AND INH-REACTIVE 17-OHCS IN PLASMA FOLLOWING ADMINISTRATION OF 25 MG./KG. HYDROCORTISONE INTRAPERITONEALLY

| Porter-Silber (17-OCHS), µg./ml. | | INH ($\Delta^4$-3-KCS), µg./ml. | |
|---|---|---|---|
| Without NAPA | With NAPA, 250 mg./kg. | Without NAPA | With NAPA, 250 mg./kg. |
| 1.64 | 3.84 | 1.53 | 3.59 |
| 1.87 | 4.50 | 1.69 | 4.06 |
| 2.91 | 5.34 | 2.81 | 5.31 |
| 2.81 | 8.62 | 1.69 | 8.06 |
| [1] 2.31±.32 | 5.57±1.2 | 1.93±.3 | 5.25±.1 |

[1] Mean ± S.E.

EXAMPLE II

By means of the procedure described in Example I, the effect of N-acetyl-p-aminophenol on the plasma concentrations of various steroids was ascertained. It was found that the plasma concentrations of prednisolone, 6-methylprednisolone, triamcinolone (9α-fluoro-16α-hydroxyprednisolone) and dexamethasone (9α-fluoro-16α-methylprednisolone) increased in a manner similar to that previously found in the case of hydrocortisone, when the above steroids are individually administered to rabbits concurrently with N-acetyl-p-aminophenol. The results of these studies are summarized in the following Table III.

*Table III*

EFFECT OF N-ACETYL-p-AMINOPHENOL (NAPA) ON PLASMA LEVELS OF EXOGENOUS 17-HYDROXYCORTICOSTEROIDS (17-OCHS) IN RABBITS

| Steroid | Dosage (mg./kg.) | Time after dosage, hours | 17-OHCS plasma levels [1] | | |
|---|---|---|---|---|---|
| | | | Without NAPA (µg./ml.) | With NAPA [2] (µg./ml.) | Percent of control |
| Prednisolone | 10 | 2 | 2.56 | 5.31 | 236 |
| Do | 10 | 4 | 1.98 | 3.62 | 183 |
| Do | 10 | 6 | 0.50 | 0.95 | 189 |
| Do | 25 | 2 | 6.42 | 11.25 | 177 |
| 6-methyl prednisolone | 15 | 2 | 4.01 | 7.29 | 186 |
| Dexamethasone | 15 | 2 | 4.05 | 7.02 | 175 |
| Triamcinolone | 10 | 2 | 8.30 | 12.60 | 156 |
| Do | 15 | 2 | 10.51 | 17.97 | 171 |

[1] Determined by the Silber-Porter procedure as modified by Peterson et al. (Analyt. Chem. 29, 144, 1957). The steroids shown in the table have in common an α-ketol side chain and are known collectively as 17-hydroxycorticosteroids. Each value shown is the average of 4 rabbits.
[2] N-acetyl-p-aminophenol, 250 mg./kg. body wt. administered orally 30 minutes before the steroid.

EXAMPLE III

The effect of the conjoint administration of N-acetyl-p-aminophenol with hydrocortisone on plasma hydrocortisone concentrations was determined on human subjects.

All five patients were post-fracture cases awaiting discharge, otherwise normal in all respects.

All pretreatment blood samples were drawn about the same time (9:30 a.m.). Normal 17-OHCS values, 6–25 mg./100 cc.

The results of those studies are summarized below in Table IV.

*Table IV*

PLASMA 17-HYDROXYCORTICOSTEROID (17-OHCS) LEVELS IN HUMANS FOLLOWING ORAL ADMINISTRATION OF HYDROCORTISONE, N-ACETYL-p-AMINOPHENOL (NAPA), AND A COMBINATION OF BOTH DRUGS

| Patient | Drug dose | 17-OHCS plasma levels | |
|---|---|---|---|
| | | Pretreatment µg./100 ml. | 6 hrs. after dosage µg./100 ml. |
| Male 38 | NAPA 1,000 mg. (a) | 12 | 15 |
| | Hydrocortisone 20 mg. (b) | 8 | 16 |
| | Hydrocortisone 20 mg. plus NAPA 1,000 mg. (a+b) | 11 | |
| Male 24 | a | 16 | |
| | b | 12 | |
| | a+b | 17 | |
| Male 26 | a | 14 | 19 |
| | b | 9 | 11 |
| | a+b | 10 | 30 |
| Female 38 | a | 19 | 11 |
| | b | 11 | 8 |
| | a+b | 17 | 22 |
| Female 25 | a | 19 | 10 |
| | b | 16 | 24 |
| | a+b | 15 | 38 |

It is seen from the above table that the administration of N-acetyl-p-aminophenol conjointly with hydrocortisone to 5 human subjects gave rise to plasma hydrocortisone concentrations which were twice those attained when hydrocortisone alone was administered. Hydrocortisone was employed in these experiments as an example of a typical adrenocortical steroid, and similar results would be expected if hydrocortisone were replaced by prednisolone, triamcinolone, or any other similar steroid currently employed as a therapeutic agent.

EXAMPLE IV

EFFECT OF N-ACETYL-p-AMINOPHENOL (NAPA) ON PLASMA LEVELS OF ADMINISTERED TRIAMCINOLONE (9α-FLUORO-16α-HYDROXYPREDNISOLONE) IN RABBITS

| Rabbit No. | Drug dosage, triamcinolone, mg./kg. body wt. | NAPA, mg./kg. | Triamcinolone plasma levels | |
|---|---|---|---|---|
| | | | µg./ml. | Percent of control |
| 1 | 10 | | 0.74 | 184 |
| | 10 | 250 | 1.36 | |
| 2 | 10 | | 1.07 | 174 |
| | 10 | 250 | 1.78 | |
| 3 | 10 | | 1.36 | 140 |
| | 10 | 250 | 1.91 | |
| 4 | 10 | | 1.40 | 133 |
| | 10 | 250 | 1.86 | |
| Mean | | | | 157.7 |

The following are examples of compositions according to this invention:

*Composition 1*

| | Milligrams |
|---|---|
| Prednisolone | 1.0 |
| N-acetyl-p-aminophenol | 500.0 |
| Wheat starch | 45.0 |
| Magnesium stearate | 5.5 |

*Composition 2*

| | |
|---|---|
| Prednisolone | 2.5 |
| N-acetyl-p-aminophenol | 500.0 |
| Wheat starch | 45.0 |
| Magnesium stearate | 5.5 |

Composition 3

| | |
|---|---|
| 6-methylprednisolone | 1.0 |
| N-acetyl-p-aminophenol | 500.0 |
| Wheat starch | 45.0 |
| Magnesium stearate | 5.5 |

Composition 4

| | |
|---|---|
| Triamcinolone | 1.0 |
| N-acetyl-p-aminophenol | 500.0 |
| Wheat starch | 45.0 |
| Magnesium stearate | 5.5 |

Composition 5

| | |
|---|---|
| Dexamethasone | 0.5 |
| N-acetyl-p-aminophenol | 500.0 |
| Wheat starch | 45.0 |
| Magnesium stearate | 5.5 |

Although the ratio of steroid to inhibitor is given by way of example from 1:200 to 1:1000 the ratio can be varied from 1:10 to 1:10,000.

This application is a continuation-in-part of my co-pending application Serial No. 757,465 filed August 27, 1958, now abandoned.

I claim:

1. A therapeutic composition comprising as its active ingredients hydrocortisone and N-acetyl-p-aminophenol in a ratio of between 1:10 and 1:1000.

2. A therapeutic composition comprising as its active ingredients cortisone and N-acetyl-p-aminophenol in a ratio of between 1:10 and 1:1000.

3. A therapeutic composition comprising as its active ingredients prednisolone and N-acetyl-p-aminophenol in a ratio of between 1:10 and 1:1000.

4. A therapeutic composition comprising as its active ingredients prednisone and N-acetyl-p-aminophenol in a ratio of between 1:10 and 1:1000.

5. A therapeutic composition comprising N-acetyl-p-aminophenol and 6α-methylprednisolone.

6. A therapeutic composition comprising N-acetyl-p-aminophenol and dexamethasone.

7. A therapeutic composition comprising N-acetyl-p-aminophenol and triamcinolone.

References Cited in the file of this patent

Corte et al. (58): P.S.E.B.M., 97:4, pp. 751–755, April 1958.

Corte et al. (57): Canadian Pharm. J., vol. 90, pp. 436–438, July 1957.

Denko et al.: P.S.E.B.M., vol. 95, pp. 483–484, July 1957.

Roskam: J.A.M.A., 161:7, p. 661, June 16, 1956.

C & E News, 34:51, p. 6186, Dec. 17, 1956.

Batterman et al.: Federation Proceedings, vol. 14, pp. 316–317, March 1955.

Wallenstein et al.: Federation Proceedings, vol. 13, p. 414, March 1954.

Cornely et al.: J.A.M.A., 160:14, pp. 1219–1221, Apr. 7, 1956.